US009793759B2

(12) United States Patent
Murakami et al.

(10) Patent No.: US 9,793,759 B2
(45) Date of Patent: Oct. 17, 2017

(54) FEED UNIT, ELECTRONIC UNIT, AND FEED SYSTEM

(75) Inventors: Tomomichi Murakami, Tokyo (JP); Yoshitaka Yoshino, Tokyo (JP)

(73) Assignee: Sony Corporation, Tokyo (JP)

( * ) Notice: Subject to any disclaimer, the term of this patent is extended or adjusted under 35 U.S.C. 154(b) by 237 days.

(21) Appl. No.: 14/342,126

(22) PCT Filed: Sep. 3, 2012

(86) PCT No.: PCT/JP2012/073241
§ 371 (c)(1),
(2), (4) Date: Feb. 28, 2014

(87) PCT Pub. No.: WO2013/035884
PCT Pub. Date: Mar. 14, 2013

(65) Prior Publication Data
US 2014/0217969 A1 Aug. 7, 2014

(30) Foreign Application Priority Data

Sep. 6, 2011 (JP) .................................. 2011-193543

(51) Int. Cl.
| H02J 17/00 | (2006.01) |
| H02J 5/00 | (2016.01) |
| H02J 7/00 | (2006.01) |
| H02J 7/02 | (2016.01) |
| H02J 50/40 | (2016.01) |
| H02J 50/12 | (2016.01) |

(52) U.S. Cl.
CPC .............. *H02J 17/00* (2013.01); *H02J 5/005* (2013.01); *H02J 7/0044* (2013.01); *H02J 7/025* (2013.01); *H02J 50/12* (2016.02); *H02J 50/40* (2016.02)

(58) Field of Classification Search
CPC ....................................................... H02J 17/00
USPC ......................................................... 320/108
See application file for complete search history.

(56) References Cited

U.S. PATENT DOCUMENTS

| 7,570,220 B2 * | 8/2009 | Hall .................... G08B 13/2477 340/572.7 |
| 7,919,886 B2 * | 4/2011 | Tanaka ............... G06K 19/0701 307/104 |
| 8,497,658 B2 * | 7/2013 | Von Novak ............. H02J 7/025 320/108 |

(Continued)

FOREIGN PATENT DOCUMENTS

| JP | 2001-238372 | 8/2001 |
| WO | WO 2008/002305 | 1/2008 |

*Primary Examiner* — Drew A Dunn
*Assistant Examiner* — Jerry D Robbins
(74) *Attorney, Agent, or Firm* — Chip Law Group

(57) ABSTRACT

A power receiving circuit, a power transmitting circuit, an apparatus, and a feed system are disclosed. The power receiving circuit receives power in a noncontact manner, and includes an LC parallel resonant circuit and a reactance element that is electrically connected in series to the LC parallel resonant circuit. The reactive element may be a capacitive or inductive element. In effect, a coil or capacitor in the LC parallel resonant circuit and the reactance element define another LC resonant circuit, namely, an LC series resonant circuit. The power transmitting circuit transmits power in a noncontact manner, and in one example, may also include a similar configuration.

20 Claims, 11 Drawing Sheets

(56) References Cited

U.S. PATENT DOCUMENTS

| | | | | |
|---|---|---|---|---|
| 8,855,554 B2* | 10/2014 | Cook | .................... | H02J 5/005 |
| | | | | 307/104 |
| 9,024,481 B2* | 5/2015 | Komiyama | ............ | H02J 5/005 |
| | | | | 307/104 |
| 9,252,604 B2* | 2/2016 | Kim | ...................... | H02J 7/0024 |
| 2002/0044092 A1* | 4/2002 | Kushihi | ................ | H01Q 1/243 |
| | | | | 343/702 |
| 2002/0097114 A1* | 7/2002 | Nakano | ................ | H01P 1/2039 |
| | | | | 333/175 |
| 2010/0219696 A1* | 9/2010 | Kojima | .................. | H02J 5/005 |
| | | | | 307/104 |
| 2012/0056580 A1* | 3/2012 | Kai | ....................... | H02J 5/005 |
| | | | | 320/108 |

* cited by examiner

[ FIG. 1 ]
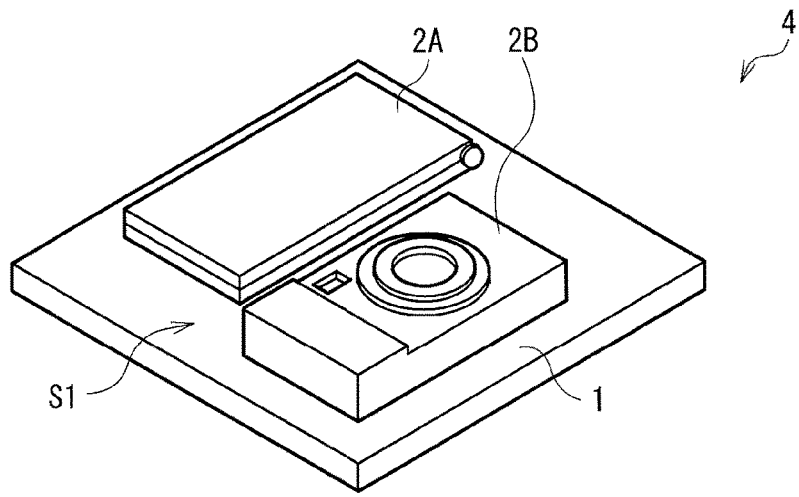
[ FIG. 2 ]
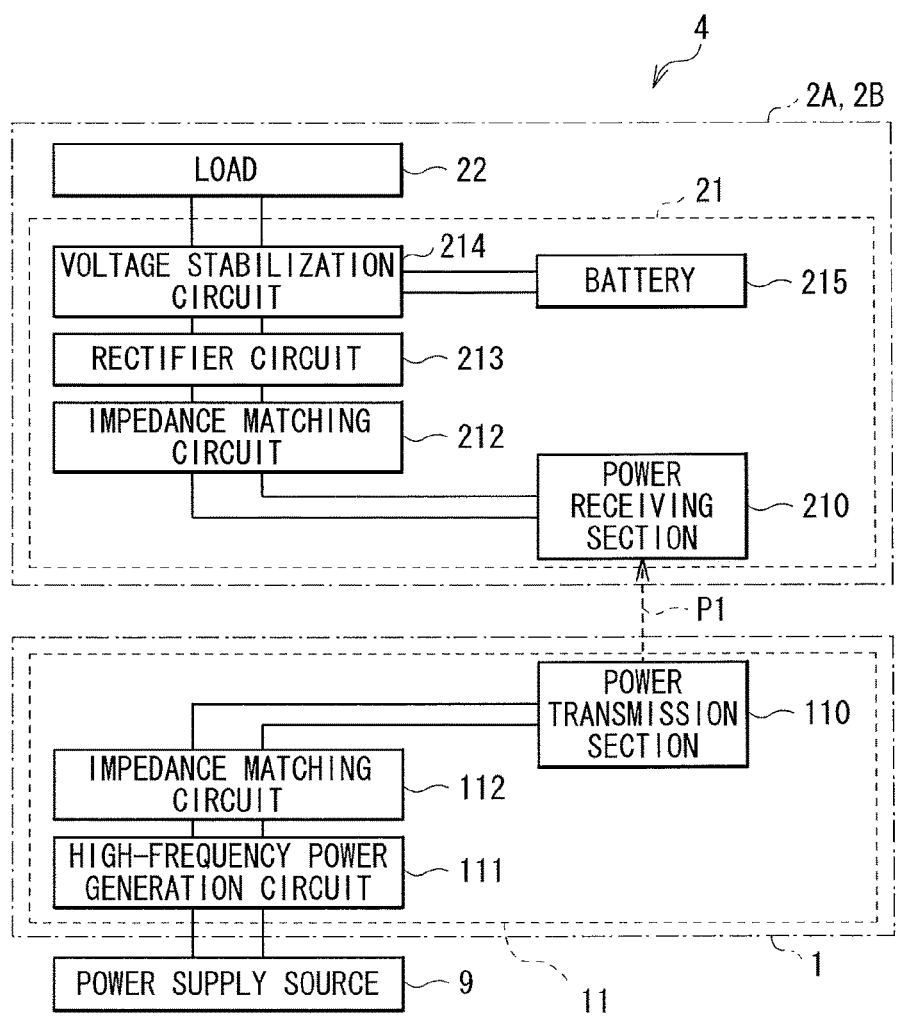

[ FIG. 3 ]
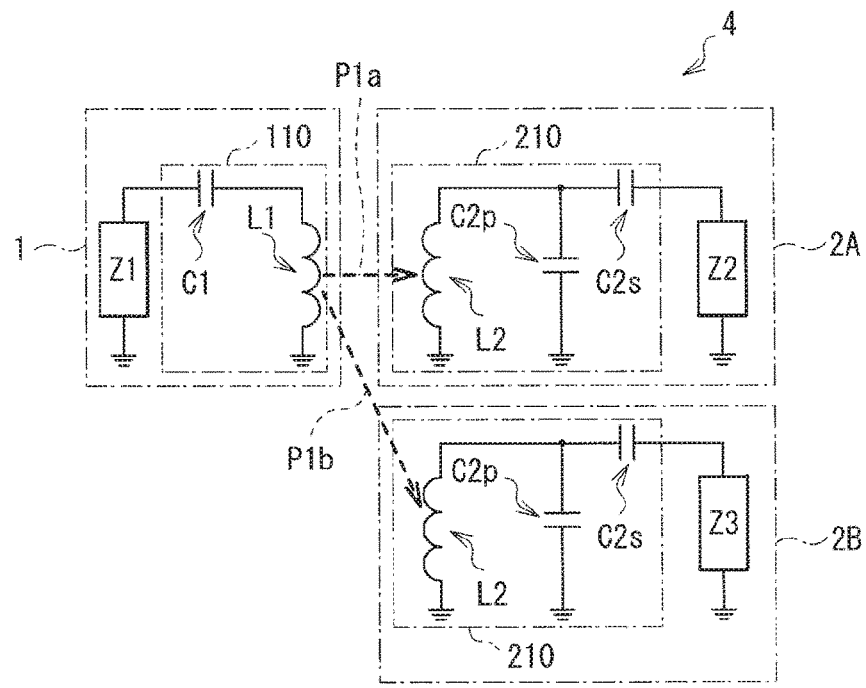
[ FIG. 4 ]
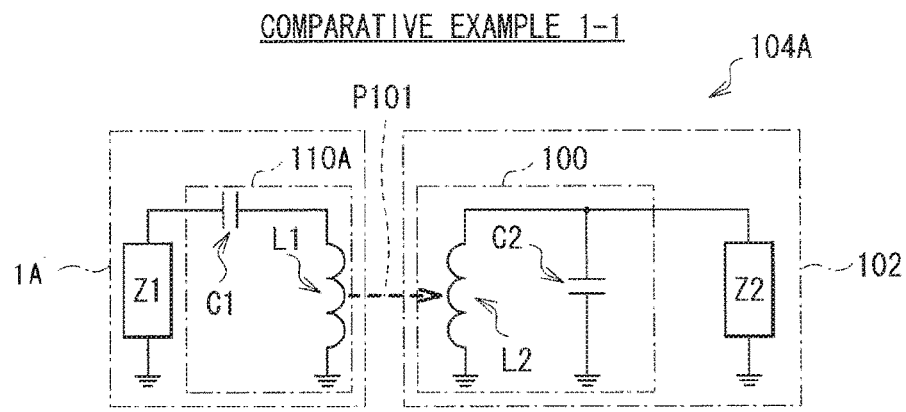

[ FIG. 5A ]
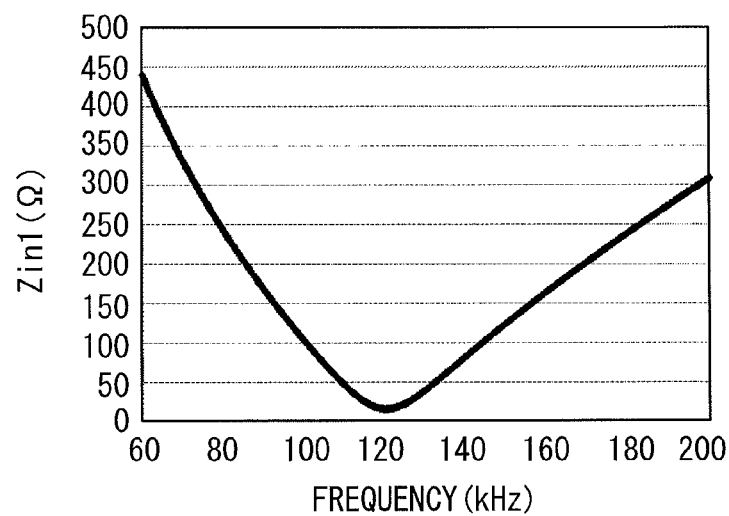
COMPARATIVE EXAMPLE 1-1
[ FIG. 5B ]
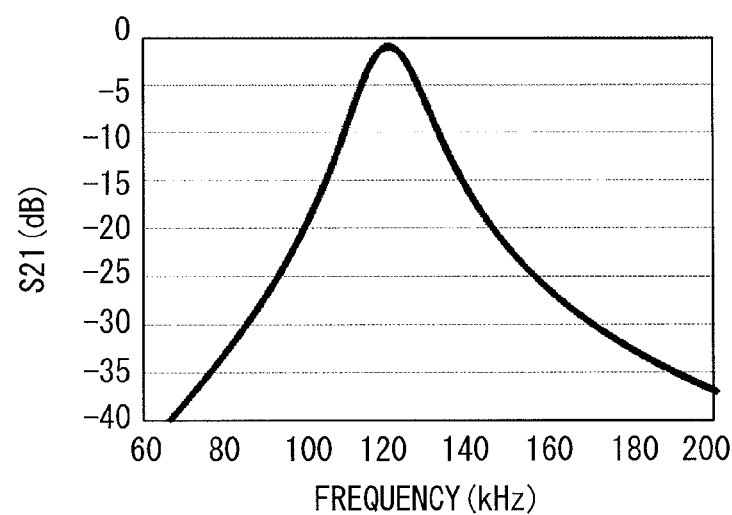

[ FIG. 6 ]
COMPARATIVE EXAMPLE 1-2
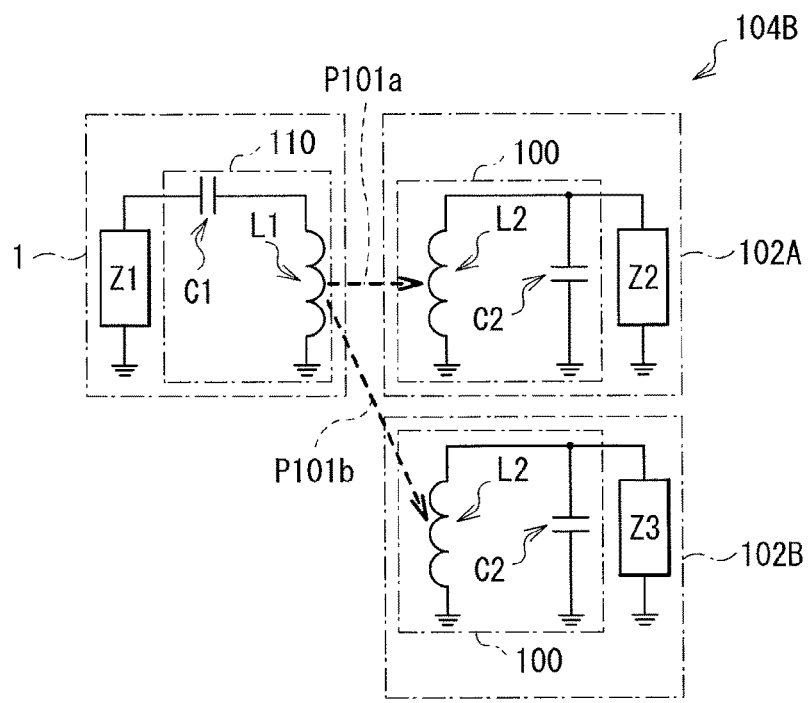

[ FIG. 7A ]
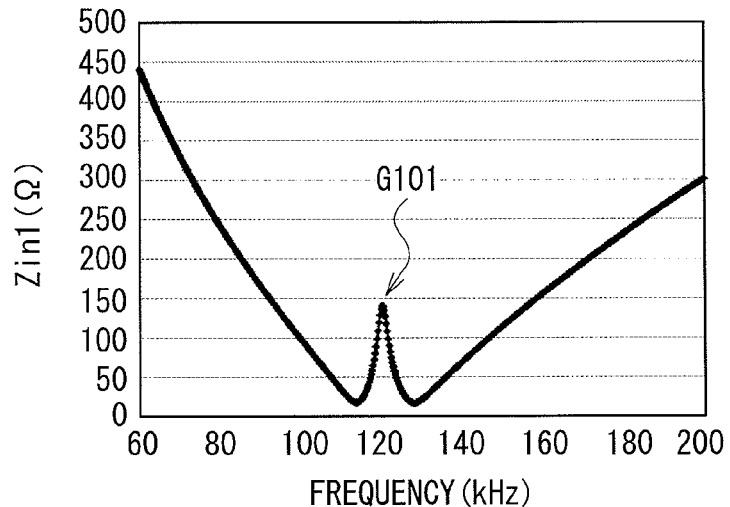
[ FIG. 7B ]
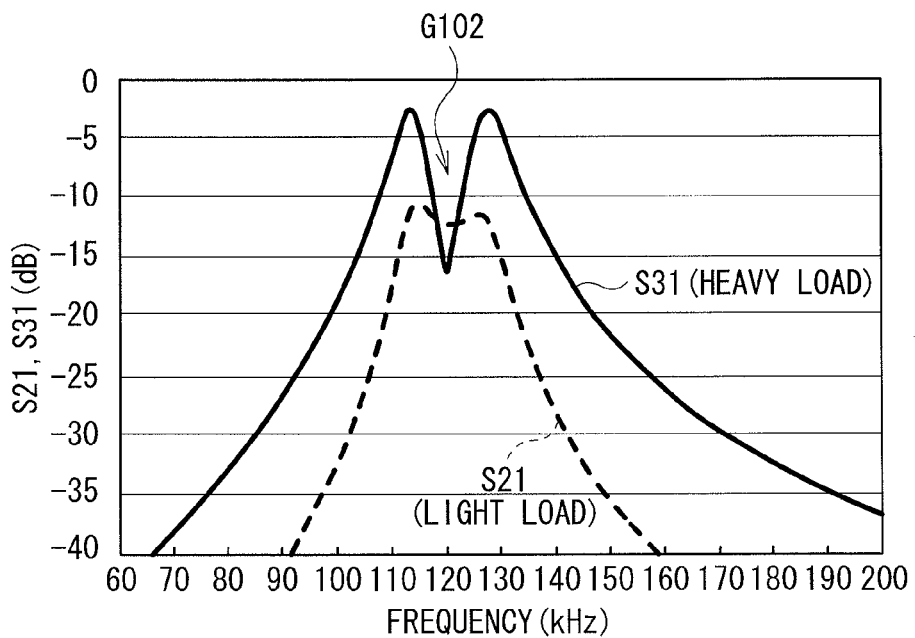

[ FIG. 8 ]
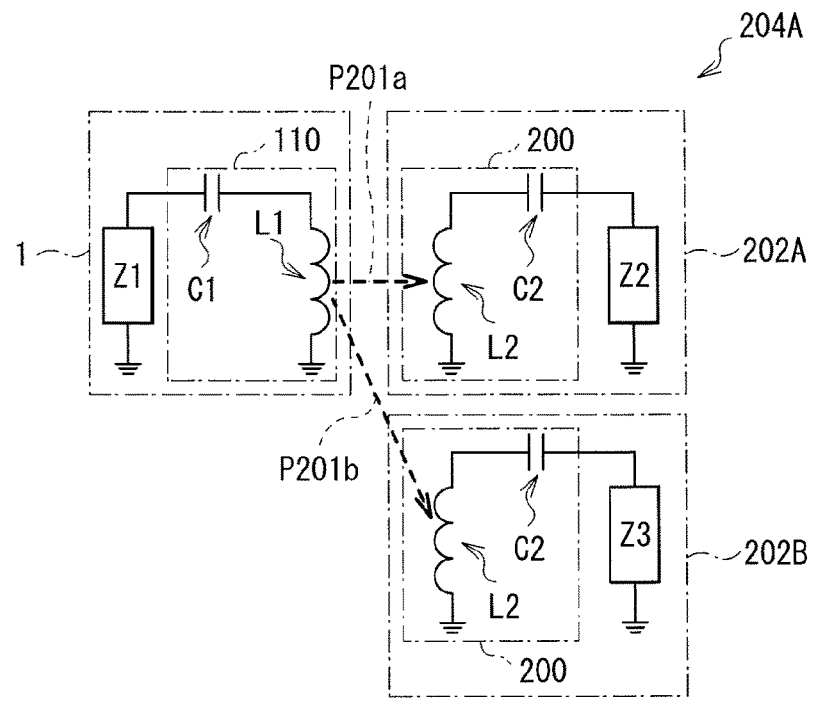
[ FIG. 9 ]
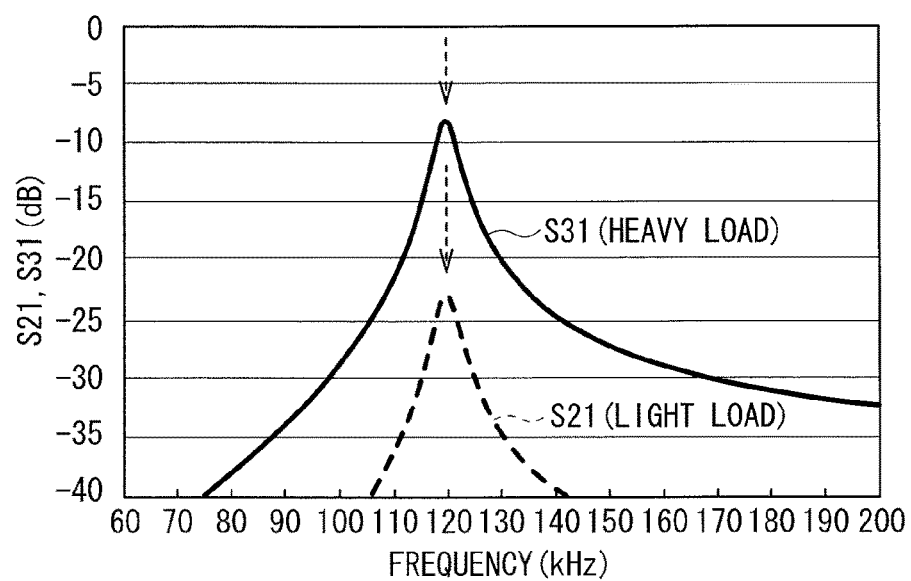

[ FIG. 10 ]
COMPARATIVE EXAMPLE 2-2
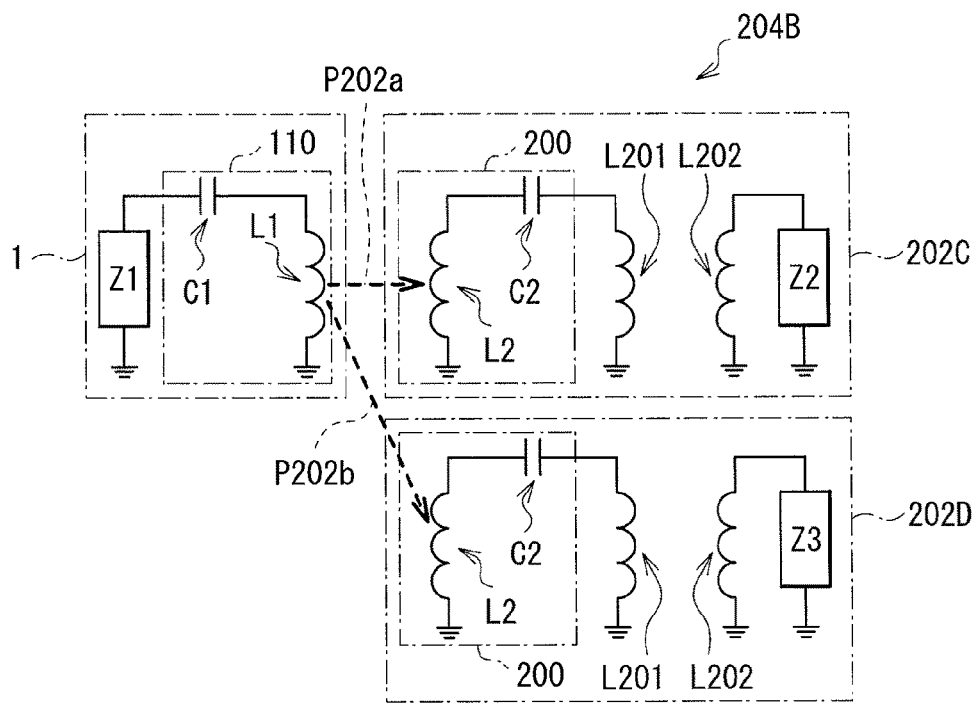
[ FIG. 11 ]
COMPARATIVE EXAMPLE 2-2
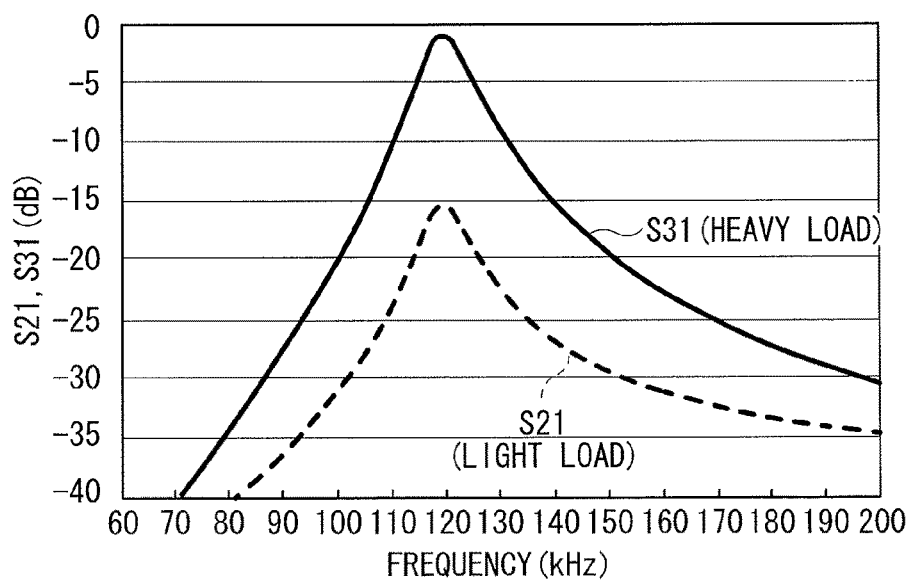

[ FIG. 12A ]
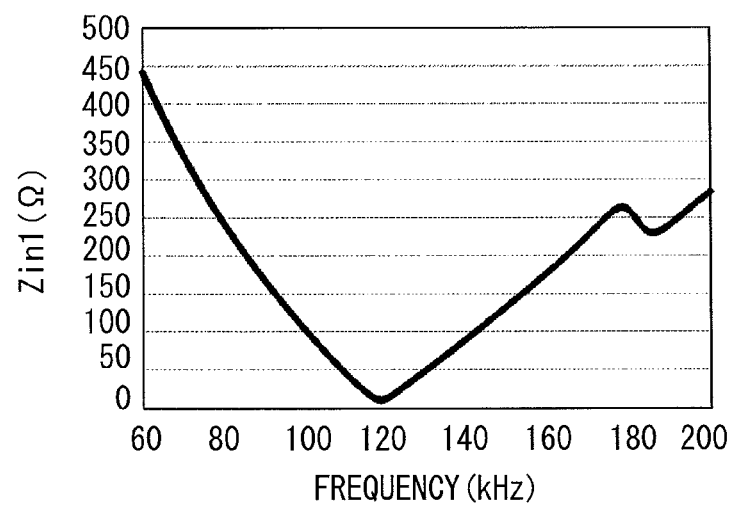
[ FIG. 12B ]
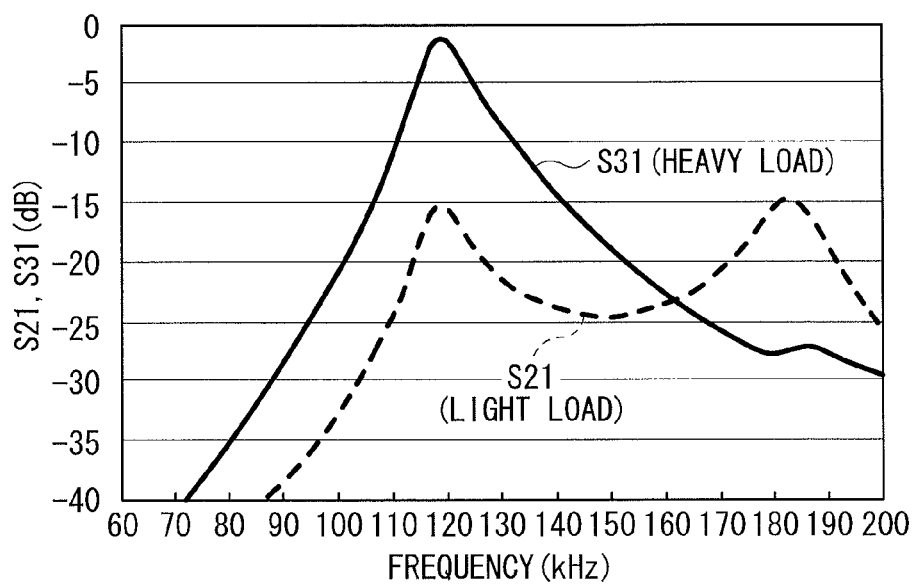

[ FIG. 13 ]
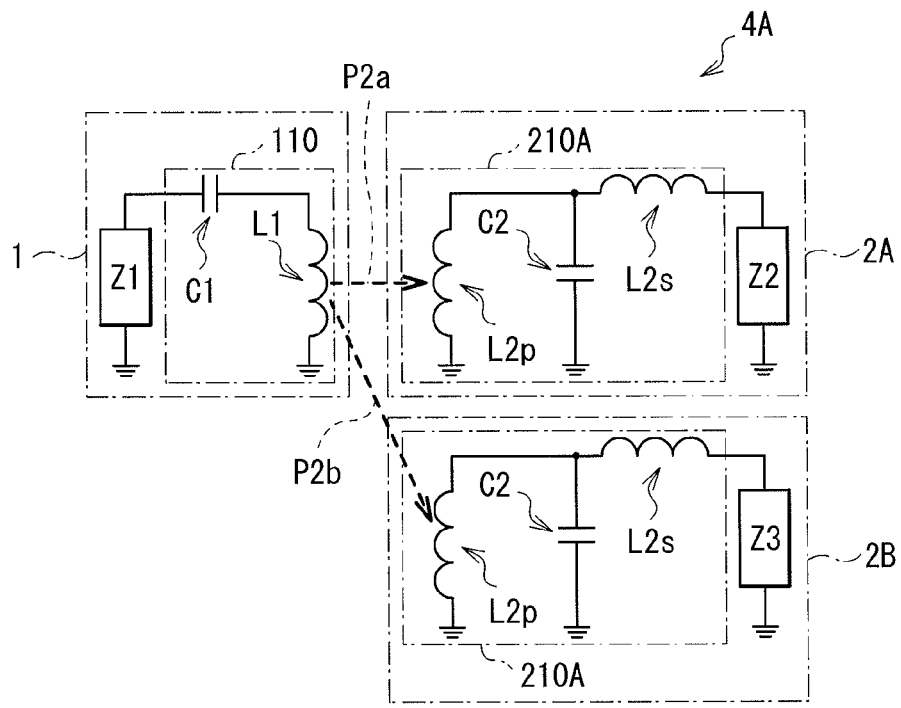
[ FIG. 14 ]
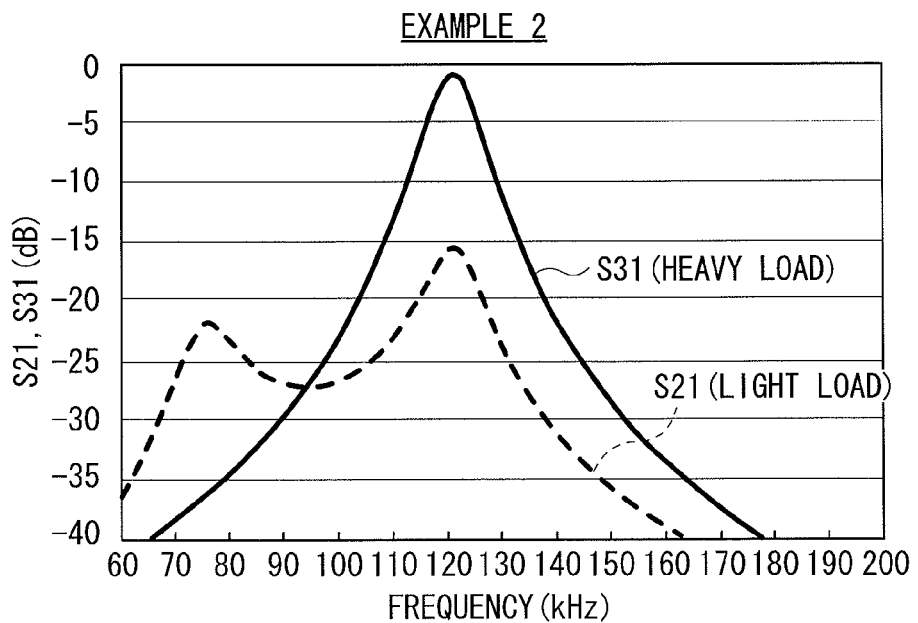

[ FIG. 15A ]
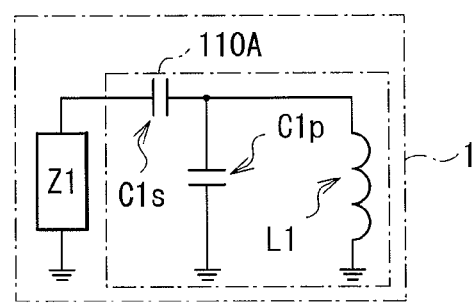
[ FIG. 15B ]
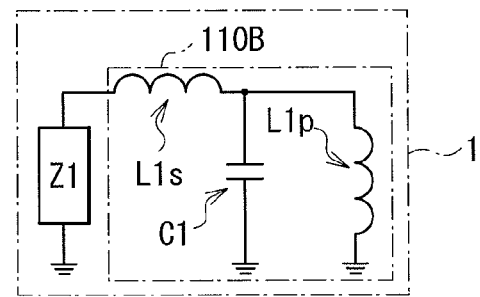

[ FIG. 16 ]
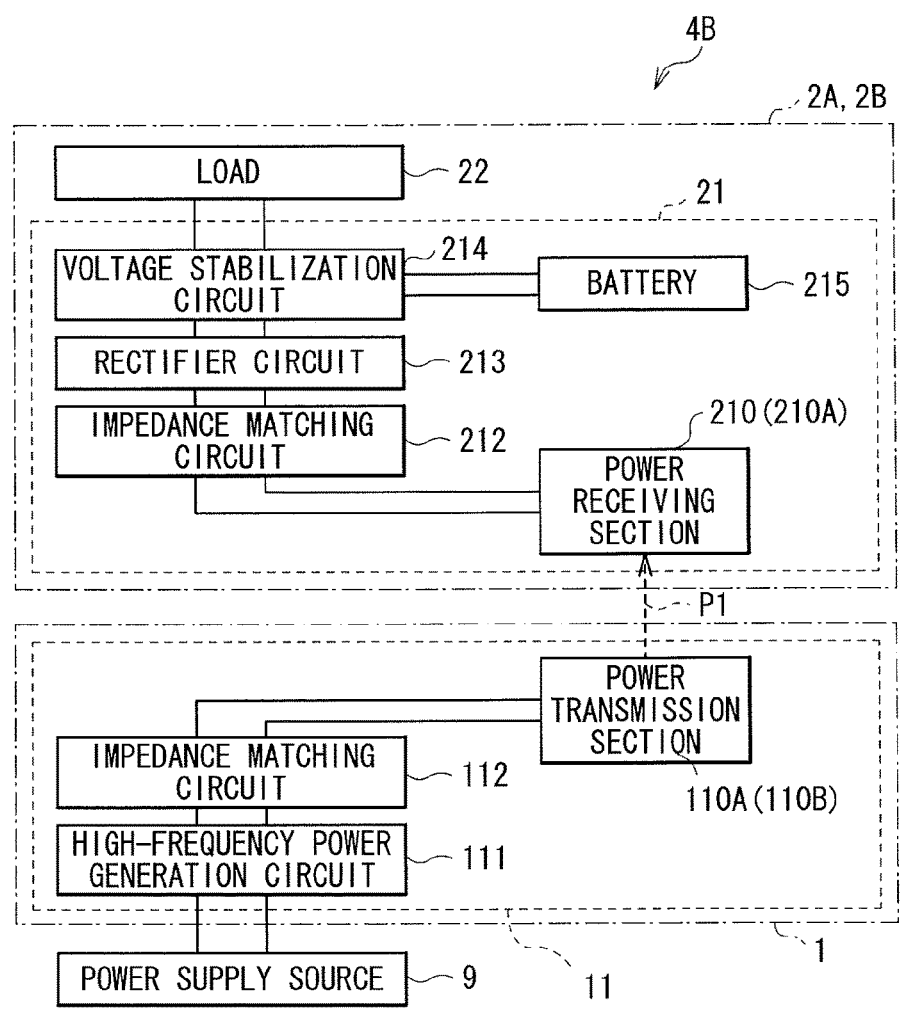

FEED UNIT, ELECTRONIC UNIT, AND FEED SYSTEM

TECHNICAL FIELD

The present disclosure relates to a feed system that supplies (transmits) power to a target unit, such as an electronic unit, in a noncontact manner, and a feed unit and the electronic unit used for the feed system.

BACKGROUND ART

Recently, a feed system, such as a noncontact feed system and a wireless charging system, has been noticed, which supplies (transmits) power to consumer electronics (CE) devices such as a mobile phone and a portable music player in a noncontact manner. This enables charge of an electronic unit (secondary unit) only by placing the electronic unit on a charging tray (primary unit) instead of inserting or connecting a connector of a power supply unit, such as an AC adaptor, into or to the electronic unit. Specifically, this eliminates terminal connection between the electronic unit and the charging tray.

An electromagnetic-induction-type power supply is generally known as such noncontact power supply. In addition, a noncontact feed system has been recently noticed, which utilizes a method, called magnetic resonance method, based on an electromagnetic resonance phenomenon. Such a noncontact feed system is, for example, disclosed in NTL 1.

CITATION LIST

Non-Patent Literature

[NTL 1] K. Kanai and others, "Solution to Voltage Ratio Problem on the Moving Pick-up Type Contactless Power Transfer System Using Series and Parallel Resonant Capacitors", Proceeding of Technical Meeting on Semiconductor Power Conversion, SPC-10-021 (Jan. 29, 2010)

SUMMARY OF INVENTION

In the noncontact feed system as described above, it would be useful to improve transmission characteristics, for example, transmission efficiency, for charge of a plurality of feeding target units (so-called 1:N charge), for example. In addition, it would be useful to improve the transmission characteristics in a simple configuration without increasing the number of components, for example. It is therefore desirable to propose a method that enables an improvement in transmission characteristics in a simple configuration during power transmission with a magnetic field (noncontact feeding).

It is desirable to provide a feed unit, a target unit, and a feed system, which enable an improvement in transmission characteristics in a simple configuration during power transmission with a magnetic field. Disclosed herein are one or more inventions pertaining to feed units, target units, and feed systems.

According to one embodiment, a power receiving circuit that receives power in a noncontact manner is provided. In particular, the power receiving circuit includes an LC parallel resonant circuit and a reactance element electrically connected in series to the LC parallel resonant circuit. The reactance element may be a capacitive element or an inductive element. Further, a coil or a capacitor in the LC parallel resonant circuit and the reactance element define an LC series resonant circuit.

According to another embodiment, a power transmitting circuit that transmits power in a noncontact manner is provided. In particular, the power transmitting circuit includes an LC parallel resonant circuit and a reactance element electrically connected in series to the LC parallel resonant circuit. The reactance element may be a capacitive element or an inductive element. Further, a coil or a capacitor in the LC parallel resonant circuit and the reactance element define an LC series resonant circuit.

In other embodiments, an apparatus and a feed system are provided. More particularly, the apparatus, such as an electronic unit, includes a power receiving section that includes an LC parallel circuit and a reactance element electrically connected in series to the LC parallel resonant circuit. The power receiving section receives power in a noncontact manner. In this regard, power may be transmitted with a magnetic field and received via a coil (a power receiving coil) in the LC parallel resonant circuit. Further, the coil or a capacitor in the LC parallel resonant circuit and the reactance element define an LC series resonant circuit. The reactance element may be a capacitive element or an inductive element.

A feed system according to one embodiment includes a feed unit and one or more target units receiving power transmitted by the feed unit. Each of the one or more target units includes a power receiving section that receives power from the feed unit in a noncontact manner. The power receiving section has an LC parallel resonant circuit and a reactance element electrically connected in series to the LC parallel resonant circuit. The reactance element may be a capacitive or inductive element. Further, a coil or a capacitor in the LC parallel resonant circuit and the reactance element define an LC series resonant circuit.

In another embodiment, a feed system including a feed unit and one or more target units (e.g., electronic units) receiving power transmitted by the feed unit is provided. The feed unit includes a power transmission section including an LC parallel resonant circuit and a reactance element electrically connected in series to the LC parallel resonant circuit. The reactance element may be a capacitive or inductive element. The power transmission section transmits power to each of the one or more target units in a noncontact manner. In this regard, power may be transmitted with a magnetic field via a coil (a power transmission coil) in the LC parallel resonant circuit. Further, a coil or a capacitor in the LC parallel resonant circuit and the reactance element define an LC series resonant circuit.

A feed system according to an embodiment of the disclosure may include one or more electronic units, and a feed unit transmitting power to the one or more electronic units. The feed unit may include a power transmission section including a power transmission coil for power transmission and a first capacitor, and the electronic units may each include a power receiving section including a power receiving coil receiving power transmitted through power transmission and a second capacitor. In one or both of the power transmission section and the power receiving section, the power transmission coil or the power receiving coil and the first or second capacitor are connected in parallel to each other and thus define a parallel circuit, and a reactance element is provided in series connection to the parallel circuit.

In various disclosed embodiments, a coil and a capacitor in the LC parallel resonant circuit are connected in parallel to each other, and thus form a parallel circuit, and the reactance element is connected in series to the parallel circuit. As a result, during power transmission with a magnetic field, the parallel circuit on a receive side and/or transmit side performs an LC parallel resonance operation, and the coil or the capacitor in the parallel circuit and the reactance element define a resonant circuit that performs an LC resonance operation (LC series resonance operation).

As a result, for example, even if power is transmitted to a plurality of target units, such as a plurality of electronic units, transmission characteristics including transmission efficiency are improved without increasing components. Consequently, the transmission characteristics are improved in a simple configuration during power transmission with a magnetic field.

It is to be understood that both the foregoing general description and the following detailed description are provided for purpose of illustration only, and not by way of limitation.

BRIEF DESCRIPTION OF DRAWINGS

The accompanying drawings are included to provide a further understanding of the disclosure, and are incorporated in and constitute a part of this specification. The drawings illustrate embodiments and, together with the specification, serve to explain the principles of the technology.

FIG. 1 is a perspective view illustrating an example appearance configuration of a feed system according to a first embodiment of the disclosure.

FIG. 2 is a block diagram illustrating an example detailed configuration of the feed system shown in FIG. 1.

FIG. 3 is a circuit diagram illustrating an example detailed configuration of each of a power transmission section and a power receiving section shown in FIG. 2.

FIG. 4 is a circuit diagram illustrating an example configuration of each of a power transmission section and a power receiving section of a feed system according to a comparative example 1-1.

FIGS. 5A and 5B are characteristic diagrams illustrating example transmission characteristics according to the comparative example 1-1.

FIG. 6 is a circuit diagram illustrating an example configuration of each of a power transmission section and a power receiving section of a feed system according to a comparative example 1-2.

FIGS. 7A and 7B are characteristic diagrams illustrating example transmission characteristics according to the comparative example 1-2.

FIG. 8 is a circuit diagram illustrating an example configuration of each of a power transmission section and a power receiving section of a feed system according to a comparative example 2-1.

FIG. 9 is a characteristic diagram illustrating example transmission characteristics according to the comparative example 2-1.

FIG. 10 is a circuit diagram illustrating an example configuration of each of a power transmission section and a power receiving section of a feed system according to a comparative example 2-2.

FIG. 11 is a characteristic diagram illustrating example transmission characteristics according to the comparative example 2-2.

FIGS. 12A and 12B are characteristic diagrams illustrating example transmission characteristics according to Example 1 of the first embodiment.

FIG. 13 is a circuit diagram illustrating an example configuration of each of a power transmission section and a power receiving section of a feed system according to a second embodiment.

FIG. 14 is a characteristic diagram illustrating example transmission characteristics according to Example 2 of the second embodiment.

FIGS. 15A and 15B are circuit diagrams illustrating an example configuration of a power transmission section of a feed system according to a third embodiment.

FIG. 16 is a block diagram illustrating an example configuration of a feed system according to a fourth embodiment.

DESCRIPTION OF EMBODIMENTS

Hereinafter, embodiments of the disclosure will be described in detail with reference to the accompanying drawings. It is to be noted that description is made in the following order.

1. First Embodiment (example of a secondary unit where a capacitive element is connected in series to an LC parallel resonant circuit)
2. Second Embodiment (example of a secondary unit where an inductive element is connected in series to an LC parallel resonant circuit)
3. Third Embodiment (example of a primary unit where a capacitive or inductive element is connected in series to an LC parallel resonant circuit)
4. Fourth Embodiment (example of a combination of the primary and secondary units in the first to third embodiments)
5. Modifications

[First Embodiment]
[Overall Configuration of Feed System 4]

FIG. 1 illustrates an example appearance configuration of a feed system (a feed system 4) according to a first embodiment of the disclosure. FIG. 2 illustrates an example block configuration of the feed system 4. The feed system 4 is an example of a noncontact feed system that performs power transmission (power supply, or feeding) in a noncontact manner with a magnetic field (e.g., with magnetic resonance, electromagnetic induction, and others). The feed system 4 includes a feed unit 1 (primary unit) and one or more electronic units, here, two electronic units 2A and 2B (secondary units) as feeding target units.

In the feed system 4, for example, as shown in FIG. 1, when the electronic units 2A and 2B are placed on (or set in proximity to) a feed face (power transmission face) S1 of the feed unit 1, the feed unit 1 transmits power to the electronic units 2A and 2B. Here, the feed unit 1 has a mat-like (tray-like) shape, in which an area of the feed face S1 is larger than an area of the plurality of electronic units 2A and 2B as a feeding target in consideration of a case where power is transmitted to the electronic units 2A and 2B simultaneously or in a time-division manner (sequentially).

(Feed Unit 1)

As described above, the feed unit 1, as a charging tray, transmits power to the electronic units 2A and 2B with a magnetic field. For example, as shown in FIG. 2, the feed unit 1 includes a power transmission sub-unit 11 including a power transmission section 110, a high-frequency power generation circuit (an AC signal generation circuit) 111, and an impedance matching circuit 112.

The power transmission section 110 includes a power transmission coil (primary coil) L1 described below and a capacitor C1 (resonance capacitor, or a first capacitor). The power transmission section 110 includes the power transmission coil L1 and the capacitor C1 and thus performs power transmission with a magnetic field to the electronic units 2A and 2B (more particularly, to a power receiving section 210 described below). In detail, the power transmission section 110 has a function of emitting a magnetic field (magnetic fluxes) from the feed face S1 to the electronic units 2A and 2B. It is to be noted that a detailed configuration of the power transmission section 110 is described below (FIG. 3).

The high-frequency power generation circuit 111 is a circuit generating a predetermined high-frequency power (AC signal) for power transmission with power supplied from an external power supply source 9 of the feed unit 1, for example. Such a high-frequency power generation circuit 111 includes, for example, a switching amplifier.

The impedance matching circuit 112 is a circuit for impedance matching during power transmission. The efficiency (transmission efficiency) is improved through such impedance matching during power transmission. It is to be noted that the impedance matching circuit 112 may be omitted depending on a configuration of each of the power transmission coil L1, a power receiving coil L2 described below, and a resonance capacitor.

(Electronic Units 2A and 2B)

The electronic units 2A and 2B include, for example, stationary electronic units, such as a television receiver, or portable electronic units, each having a rechargeable battery, Examples of a portable unit include a mobile phone and a digital camera. For example, as shown in FIG. 2, the electronic units 2A and 2B may each include a power receiving sub-unit 21, and a load 22 performing a predetermined operation (an operation allowing a function of the electronic unit to be exhibited) based on the power supplied from the power receiving sub-unit 21. The power receiving sub-unit 21 includes a power receiving section 210, an impedance matching circuit 212, a rectifier circuit 213, a voltage stabilization circuit 214, and a battery 215.

The power receiving section 210 includes the power receiving coil (secondary coil) L2 described below and a capacitor C2p (resonance capacitor, or a second capacitor). The power receiving section 210 includes the power receiving coil L2 and the capacitor C2p and thus has a function of receiving power transmitted from the power transmission section 110 in the feed unit 1. A detailed configuration of the power receiving section 210 is also described below (FIG. 3).

The impedance matching circuit 212 is a circuit for impedance matching during power transmission as in the impedance matching circuit 112. It is to be noted that the impedance matching circuit 212 may also be omitted depending on the configuration of each of the power transmission coil L1, the power receiving coil L2 described below, and the resonance capacitor.

The rectifier circuit 213 is a circuit that rectifies power (AC power) supplied from the power receiving section 210 to generate DC power.

The voltage stabilization circuit 214 performs a predetermined voltage stabilization operation based on the DC power supplied from the rectifier circuit 213 to charge the battery 215 and a battery (not shown) in the load 22.

The battery 215, which is charged by the voltage stabilization circuit 214 and thus stores power, includes, for example, a rechargeable battery (secondary battery) such as a lithium-ion battery. It is to be noted that in the case where only the battery in the load 22 is used, or the like, the battery 215 may be omitted.

[Detailed Configurations of Power Transmission Section 110 and Power Receiving Section 210]

(Power Transmission Section 110)

FIG. 3 is a circuit diagram illustrating an example detailed configuration of each of the power transmission section 110 and the power receiving section 210. It is to be noted that an impedance Z1 shown in the drawing indicates an impedance as seen from the power transmission section 110 to the high-frequency power generation circuit 111, and an impedance Z2 and an impedance Z3 indicate impedances as seen from the power receiving section 210 in the electronic units 2A and 2B, respectively, to the rectifier circuit 213.

The power transmission section 110 includes the power transmission coil L1 for power transmission (generation of magnetic fluxes) with a magnetic field, and the capacitor C1 that together with the power transmission coil L1 define an LC resonant circuit (LC series resonant circuit). The capacitor C1 is electrically connected in series to the power transmission coil L1. Specifically, a first end of the capacitor C1 is connected to a first end of a block of the impedance Z1, a second end of the capacitor C1 is connected to a first end of the power transmission coil L1, and a second end of the power transmission coil L1 is grounded. It is to be noted that a second end of the block of the impedance Z1 is also grounded.

The LC series resonant circuit including the power transmission coil L1 and the capacitor C1 performs an LC resonance operation at a resonance frequency, $f_{res}=1/\{2\pi \times \sqrt{(L1 \times C1)}\}$, which is substantially the same as or close to a frequency of the high-frequency power (AC signal) generated by the high-frequency power generation circuit 111.

(Power Receiving Section 210)

The power receiving section 210 includes the power receiving coil L2 receiving power (from the magnetic fluxes) transmitted from the power transmission section 110, the capacitor C2p that together with the power receiving coil L2 define an LC resonant circuit (LC parallel resonant circuit), and a capacitor C2s as a capacitive reactance element (capacitive element). The capacitor C2p is electrically connected in parallel to the power receiving coil L2, and the capacitor C2s is electrically connected in series to the power receiving coil L2, or to the LC parallel resonant circuit. Specifically, a first end of the capacitor C2p is connected to a first end of the power receiving coil L2 and a first end of the capacitor C2s, and a second end of the capacitor C2s is connected to a first end of a block of the impedance Z2 or Z3. Second ends of the power receiving coil L2, the capacitor C2p, and the blocks of the impedance Z2 and the impedance Z3 are grounded.

In the embodiment, the power receiving coil L2 and the capacitor C2p define the LC parallel resonant circuit, and the power receiving coil L2 in the LC parallel resonant circuit and the capacitor C2s define the LC resonant circuit (the LC series resonant circuit). In addition, as described in detail below, these two LC resonant circuits (the LC parallel resonant circuit and the LC series resonant circuit) perform LC resonance operations at the resonance frequency, $f_{res}$, which is substantially the same as or close to the frequency of the high-frequency power (AC signal) generated by the high-frequency power generation circuit 111. Specifically, the LC resonant circuit (LC series resonant circuit) defined by the power transmission coil L1 and the capacitor C1 in the power transmission section 110 and each LC resonant circuit defined by the power receiving coil L2 and each of the capacitors C2p and C2s in the power receiving section 210 perform the LC resonance operations at substantially the same frequency, $f_{res}$.

[Function and Effect of Feed System 4](1. Outline of Overall Operation)

In the feed system 4, the feed unit 1 includes the high-frequency power generation circuit 111 that supplies the predetermined high-frequency power (AC signal) for power transmission to the power transmission coil L1 and the capacitor C1, or to the LC series resonant circuit, in the power transmission section 110. As a result, the power transmission coil L1 in the power transmission section 110 generates a magnetic field (magnetic fluxes). During this, the electronic units 2A and 2B as feeding target units (charging target units) are placed on (or set in proximity to) the top (the feed face S1) of the feed unit 1, and thus the power transmission coil L1 in the feed unit 1 is in proximity to the power receiving coil L2 in each of the electronic units 2A and 2B in the vicinity of the feed face S1.

In this way, the power receiving coil L2 is disposed in proximity to the power transmission coil L1 generating the magnetic field (magnetic fluxes). Thus, an electromotive force is induced in the power receiving coil L2 by the magnetic fluxes generated from the power transmission coil L1. In other words, a magnetic field is generated by electromagnetic induction or magnetic resonance in linkage to each of the power transmission coil L1 and the power receiving coil L2. Consequently, power is transmitted from the power transmission coil L1 (a primary side, namely, the feed unit 1 or the power transmission section 110) to the power receiving coil L2 (a secondary side, namely, the electronic units 2A and 2B or the power receiving section 210) (see power P1, P1a, and P1b shown in FIGS. 2 and 3). During this, the power transmission coil L1 and the capacitor C1 perform the LC resonance operation in the feed unit 1, and the power receiving coil L2 and the capacitors C2p and C2s perform the LC resonance operation in the electronic units 2A and 2B.

In the electronic units 2A and 2B, the AC power received by the power receiving coil L2 is thus supplied to the rectifier circuit 213 and the voltage stabilization circuit 214 for the following charging operation. Specifically, the AC power is converted to a predetermined DC power by the rectifier circuit 213, and then the voltage stabilization circuit 214 performs a voltage stabilization operation based on the DC power for charge of the battery 215 or the battery (not shown) in the load 22. In this way, a charging operation is performed in the electronic units 2A and 2B based on the power received by the power receiving section 210.

Specifically, in the embodiment, the electronic units 2A and 2B are placed on (or set in proximity to) the feed face S1 of the feed unit 1, and thereby are readily charged without terminal connection to an AC adaptor, for example (are readily supplied with power in a noncontact manner). This reduces a burden on a user.

(Function of Power Receiving Section 210)

The function of the power receiving section 210 in the embodiment is now described in detail in comparison with comparative examples (comparative examples 1-1, 1-2, 2-1, and 2-2).

COMPARATIVE EXAMPLE 1-1

FIG. 4 illustrates a circuit configuration of each of a feed section (power transmission section) 110 and a power receiving section 100 in a feed system (a feed system 104A) according to a comparative example 1-1. In the comparative example 1-1, the feed system 104A includes one feed unit 1A having a power transmission section 110A, and one electronic unit 102 having a power receiving section. The electronic unit 102 has a configuration similar to that of the electronic units 2A and 2B in the embodiment except that the power receiving section 100 is provided in place of the power receiving section 210.

The power receiving section 100 includes a power receiving coil L2 and a capacitor C2 as a resonance capacitor. The power receiving coil L2 and the capacitor C2 are connected in parallel to each other and thus define an LC parallel resonant circuit. Specifically, the power receiving section 100 is different in a configuration from the power receiving section 210 in that the capacitor C2 is provided in place of the capacitor C2p, while the capacitor C2s is not provided (is omitted).

The feed system 104A including the power receiving section 100 having such a configuration shows transmission characteristics, for example, as shown in FIGS. 5A and 5B during power transmission with a magnetic field as shown by an arrow P101 in FIG. 4, for example. Specifically, for example, the transmission characteristic (frequency dependence of input impedance Zin1 of the feed unit 1) illustrated in FIG. 5A shows that the input impedance Zin1 is minimized at a frequency in the vicinity of the resonance frequency $f_{res}$ of 120 kHz. In addition, for example, the transmission characteristic (frequency dependence of an S parameter S21 for transmission efficiency between the feed unit 1 (primary side) and the electronic unit 102 (secondary side)) illustrated in FIG. 5B shows that the S parameter S21 is maximized at a frequency in the vicinity of the resonance frequency $f_{res}$ of 120 kHz. Specifically, in the comparative example 1-1, desirable power transmission (power transmission at a high transmission efficiency) is achieved in the vicinity of the frequency (the resonance frequency $f_{res}$ of 120 kHz) used for power transmission.

It is to be noted that the transmission characteristics shown in FIGS. 5A and 5B are obtained by simulation under an example condition of Z1=10Ω, Z2=10Ω, L1=393 µH, C1=4.5 nF, L2=2.5 µH, and C2=703 nF. For example, a value 0.1 calculated from a measured value is used as a coupling coefficient K for the simulation herein, and in other comparative examples and Examples described below.

COMPARATIVE EXAMPLE 1-2

However, for example, if a plurality of feeding target units (here, two electronic units 102A and 102B) each having the power receiving section 100 are provided as in a feed system (a feed system 104B) according to the comparative example 1-2 shown in FIG. 6, the following difficulty may occur.

Specifically, for example, as in the transmission characteristics as shown in FIGS. 7A and 7B, the transmission characteristics may abruptly degrade at a frequency in the vicinity of the resonance frequency $f_{res}$ of 120 kHz during power transmission with a magnetic field as shown by arrows P101a and P101b in FIG. 6. Such a phenomenon tends to occur in the case where a difference in a load is large between the plurality of feeding target units, for example, in the case where one electronic unit 102A has an impedance Z2 of 300Ω (light load), and the other electronic unit 102B has an impedance Z3 of 10Ω (heavy load). In detail, in the transmission characteristic shown in FIG. 7A, the input impedance Zin1 abruptly increases at a frequency in the vicinity of the resonance frequency $f_{res}$ of 120 kHz (see a symbol G101 in FIG. 7A). In the transmission characteristic shown in FIG. 7B, both an S parameter S21 for transmission efficiency between the feed unit 1 and the electronic unit 102A (light load) and an S parameter S31 for transmission efficiency between the feed unit 1 and the electronic unit 102B (heavy load) abruptly decrease at a frequency in the vicinity of the resonance frequency $f_{res}$ of 120 kHz (see a symbol G102 in FIG. 7B). In particular, the value of the S parameter S31 on a heavy load side remarkably decreases at the frequency in the vicinity of the resonance frequency $f_{res}$ of 120 kHz.

It is to be noted that the transmission characteristics shown in FIGS. 7A and 7B are also obtained by simulation under an example condition of Z1=10Ω, Z2=300Ω, Z3=10Ω, L1=393 μH, C1=4.5 nF, L2=2.5 μH, and C2=703 nF.

Such an abrupt degradation in the transmission characteristics (in particular, on the heavy load side) at the frequency in the vicinity of the resonance frequency $f_{res}$ is caused by large impedance mismatch due to an effect (interaction) between the LC resonant circuits (the LC parallel resonant circuits in the power receiving sections 100) in the plurality of feeding target units. Such a condition that one of the plurality of feeding target units is loaded lightly while the other is loaded heavily may occur in practice, for example, in an approximately fully charged state of a battery in one feeding target unit, in a state of one feeding target unit performing communication, and in a state of the plurality of feeding target units being charged in a time-division manner.

Thus, the configuration of the power receiving section 100 in each of the comparative examples 1-1 and 1-2 hardly improves the transmission characteristics, for example, in the case of charge of the plurality of feeding target units (1:N charge).

COMPARATIVE EXAMPLE 2-1

FIG. 8 then illustrates a circuit configuration of each of a feed section (power transmission section) 110 and a power receiving section 200 in a feed system (a feed system 204A) according to a comparative example 2-1. In the comparative example 2-1, the feed system 204A includes one feed unit 1 having a power transmission section 110, and two electronic units 202A and 202B each having a power receiving section 200. The electronic units 202A and 202B each have a configuration similar to that of the electronic units 2A and 2B in the embodiment except that the power receiving section 200 is provided in place of the power receiving section 210.

The power receiving section 200 includes a power receiving coil L2 and a capacitor C2 as a resonance capacitor. The power receiving coil L2 and the capacitor C2 are connected in series to each other and thus define an LC series resonant circuit. Specifically, the power receiving section 200 is different in a configuration from the power receiving section 210 in that the capacitor C2 is provided in place of the capacitor C2s, and the capacitor C2p is not provided (is omitted).

The feed system 204A including the power receiving section 200 having such a configuration shows transmission characteristics, for example, as shown in FIG. 9 during power transmission with a magnetic field as shown by arrows P201a and P201b in FIG. 8, for example. Specifically, both an S parameter S21 for transmission efficiency between the feed unit 1 and the electronic unit 202A (light load) and an S parameter S31 for transmission efficiency between the feed unit 1 and the electronic unit 202B (heavy load) generally decrease, namely, decrease over the substantially all frequency ranges (see broken-line arrows in FIG. 9). This is because the LC series resonant circuit is formed in the power receiving section 200 and impedance is reduced thereby. It is to be noted that the transmission characteristics shown in FIG. 9 are also obtained by simulation with values of the parameters being the same as those in the comparative example 1-2.

In this way, although the configuration of the power receiving section 200 in the comparative example 2-1 does not cause the abrupt degradation in the transmission characteristics in the vicinity of the resonance frequency $f_{res}$ during charge of a plurality of feeding target units unlike in the comparative example 1-2, the configuration still hardly achieves an improvement in the transmission characteristics including transmission efficiency.

COMPARATIVE EXAMPLE 2-2

FIG. 10 illustrates a feed system (a feed system 204B) according to a comparative example 2-2, which is similar to the feed system 204A in the comparative example 2-1 except that two electronic units 202C and 202D are provided in place of the two electronic units 202A and 202B. The electronic units 202C and 202D have a configuration similar to that of the electronic units 202A and 202B, respectively, except that a transformer including a pair of coils L201 and L202 is further provided between the power receiving section 200 and a block of an impedance Z2 or Z3.

The feed system 204B further including the transformer having such a configuration shows transmission characteristics, for example, as shown in FIG. 11 during power transmission with a magnetic field as shown by arrows P202a and P202b in FIG. 10, for example. Specifically, a reduction in transmission efficiency does not occur unlike in the comparative examples 1-2 and 2-1, and both an S parameter S21 (light load) and an S parameter S31 (heavy load) are maximized at a frequency in the vicinity of the resonance frequency $f_{res}$ of 120 kHz. It is to be noted that the transmission characteristics shown in FIG. 11 are also obtained by simulation with values of the parameters being the same as those in the comparative examples 1-2 and 2-1.

In the comparative example 2-2, however, the electronic units 202C and 202D each have the transformer, including a pair of coils L201 and L202, that transforms a reduced load impedance to improve the transmission efficiency. Specifically, the number of components necessarily increases within a feeding target unit, making it difficult to improve the transmission efficiency in a simple configuration though size and cost are reduced. In addition, while an ideal transformer having no loss is used in the simulation, an actual transformer contains a resistance component causing loss, leading to a possibility of degradation in transmission efficiency.

Thus, the feeding target units, such as electronic units, in the comparative examples 1-1, 1-2, 2-1, and 2-2 hardly achieve an improvement in the transmission characteristics in a simple configuration during power transmission with a magnetic field (noncontact feeding).

(Embodiment)

In contrast, as shown in the embodiment of FIG. 3, the electronic units 2A and 2B in the embodiment each include the power receiving section 210 in which the power receiving coil L2 and the capacitor C2p are connected in parallel to each other and thus define the parallel circuit (the LC parallel resonant circuit). In addition, the capacitor C2s is connected in series to the LC parallel resonant circuit. Specifically, the power receiving coil L2 in the LC parallel resonant circuit and the capacitor C2s define the LC series resonant circuit.

As a result, the two LC resonant circuits (the LC parallel resonant circuit and the LC series resonant circuit) perform LC resonance operations at the resonance frequency, $f_{res}$, which is substantially the same as or close to the frequency of the high-frequency power generated by the high-frequency power generation circuit 111. Specifically, during power transmission with a magnetic field, the LC parallel resonant circuit performs an LC parallel resonance operation, and the power receiving coil L2 in the LC parallel resonant circuit and the capacitor C2s perform an LC series resonance operation. To collectively express the two LC resonance operations (the LC parallel resonance operation and the LC series resonance operation) of the power receiving section 210, the resonance frequency $f_{res}$ is defined by the following expression (1).

[Expression 1]

$$L2 \times (C2p + C2s) = \frac{1}{(2\pi f_{res})^2} \quad (1)$$

Consequently, for example, the embodiment shows transmission characteristics of Example 1 as shown in FIGS. 12A and 12B during power transmission with a magnetic field. Specifically, even if a difference in a load is large between a plurality of feeding target units, for example, even if one electronic unit 2A has an impedance Z2 of 300Ω (light load), and the other electronic unit 2B has an impedance Z3 of 10Ω (heavy load), the following transmission characteristics are shown. That is, as shown in FIG. 12A, the characteristics of the input impedance Zin1 does not significantly vary in the vicinity of the resonance frequency $f_{res}$ compared with a case of one feeding target unit. Moreover, as shown in FIG. 12B, a reduction in transmission efficiency does not occur as it does in the comparative examples 1-2 and 2-1, and both an S parameter S21 (light load) and an S parameter S31 (heavy load) are maximized at a frequency in the vicinity of the resonance frequency $f_{res}$ of 120 kHz. In addition, power is preferentially (more) distributed to a unit (the electronic unit 2B) on a heavy load side that needs to be supplied with relatively much power. It is to be noted that the transmission characteristics shown in FIGS. 12A and 12B are also obtained by simulation under an example condition of Z1=10Ω, Z2=300Ω, Z3=10Ω, L1=393 µH, C1=4.5 nF, L2=14 µH, C2p=55 nF, and C2s=70 nF.

Moreover, in the embodiment, each of the electronic units 2A and 2B does not need the transformer unlike in the comparative example 2-2, and thus the number of components need not be increased within a feeding target unit, and consequently transmission efficiency is improved in a simple configuration, while size and cost are reduced.

As described above, in the embodiment, the power receiving coil L2 and the capacitor C2p are connected in parallel to each other and thus define the parallel circuit (the LC parallel resonant circuit), and the capacitor C2s is connected in series to the LC parallel resonant circuit, resulting in the LC series resonance operation in addition to the LC parallel resonance operation of the LC parallel resonant circuit during power transmission with a magnetic field. Consequently, for example, even if power is transmitted to a plurality of feeding target units, such as electronic units, transmission characteristics including transmission efficiency are improved without increasing components such as a transformer and a balun. As a result, transmission characteristics are improved in a simple configuration during power transmission with a magnetic field.

In addition, a real-part impedance of each of the electronic units 2A and 2B is adjusted through varying a ratio between capacitance values of the capacitors C2p and C2s in the power receiving section 210, and thus the real-part impedance is appropriately adjusted in accordance with any primary impedance.

Furthermore, in the embodiment, compared to a second embodiment described below using an inductive reactance element such as a coil L2s, a capacitive reactance element (the capacitor C2s) is used as a reactance element connected in series to the LC parallel resonant circuit, leading to the following effects. Specifically, the capacitive reactance element typically has a higher Q value than that of the inductive reactance element, leading to a further improvement in transmission efficiency. In addition, the capacitive reactance element (such as a capacitor) is typically smaller in size than the inductive reactance element (such as a coil), leading to a reduction in size of the unit.

Other embodiments (second to fourth embodiments) of the disclosure are now described. It is to be noted that the same components as those in the first embodiment are designated by the same symbols, and description thereof is appropriately omitted.

[Second Embodiment]
[Configuration of Feed System 4]

FIG. 13 illustrates a circuit configuration of each of a power transmission section 110 and a power receiving section 210 of a feed system (feed system 4A) according to a second embodiment. The feed system 4A of the embodiment includes one feed unit 1 having a power transmission section 110, and two electronic units 2A and 2B each having a power receiving section 210A. In the embodiment, the electronic units 2A and 2B each have a configuration similar to that of the electronic units 2A and 2B in the first embodiment except that the power receiving section 210A is provided in place of the power receiving section 210.

(Power Receiving Section 210A)

The power receiving section 210A includes a power receiving coil L2p receiving power (from magnetic fluxes) transmitted from the power transmission section 110, a capacitor C2 that together with the power receiving coil L2p define an LC resonant circuit (LC parallel resonant circuit), and a coil L2s as an inductive reactance element (inductive element). The capacitor C2 is electrically connected in parallel to the power receiving coil L2p, and the coil L2s is electrically connected in series to the capacitor C2, or to the LC parallel resonant circuit. Specifically, a first end of the capacitor C2 is connected to a first end of the power receiving coil L2 and a first end of the coil L2s, and a second end of the coil L2s is connected to a first end of a block of an impedance Z2 or Z3. Second ends of the power receiving coil L2, the capacitor C2, and the blocks of the impedance Z2 and the impedance Z3 are grounded.

In the second embodiment, the power receiving coil L2p and the capacitor C2 define the LC parallel resonant circuit, and the capacitor C2 in the LC parallel resonant circuit and the coil L2s define an LC resonant circuit (an LC series resonant circuit). In addition, these two LC resonant circuits (the LC parallel resonant circuit and the LC series resonant circuit) perform LC resonance operations at the resonance frequency, $f_{res}$, which is substantially the same as or close to the frequency of the high-frequency power (AC signal) generated by the high-frequency power generation circuit 111. Specifically, the LC resonant circuit (the LC series resonant circuit) defined by the power transmission coil L1 and the capacitor C1 in the power transmission section 110 and the LC resonant circuits defined by the power receiving coil L2p, the coil L2s, and the capacitor C2 in the power receiving section 210 perform LC resonance operations at substantially the same frequency $f_{res}$.

[Function and Effect of Feed System 4A]

As described above, in the embodiment, the electronic units 2A and 2B each include the power receiving section 210A in which the power receiving coil L2p and the capacitor C2 are connected in parallel to each other and thus define the parallel circuit (the LC parallel resonant circuit). In addition, the coil L2s is connected in series to the LC parallel resonant circuit. Specifically, the capacitor C2 in the LC parallel resonant circuit and the coil L2s define the LC series resonant circuit.

Consequently, the two LC resonant circuits (the LC parallel resonant circuit and the LC series resonant circuit) perform LC resonance operations at the resonance frequency $f_{res}$ during power transmission as shown by arrows P2a and P2b in FIG. 13, for example. Specifically, during power transmission with a magnetic field, the LC parallel resonant circuit performs an LC parallel resonance operation, and the capacitor C2 in the LC parallel resonant circuit and the coil L2s perform an LC series resonance operation. To collectively express the two LC resonance operations (the LC parallel resonance operation and the LC series resonance operation) of the power receiving section 210A, the resonance frequency $f_{res}$ is defined by the following expression (2).

[Expression 2]

$$C2 \times \frac{L2p \times L2s}{(L2p + L2s)} = \frac{1}{(2\pi f_{res})^2} \quad (2)$$

As a result, for example, the embodiment shows transmission characteristics of Example 2 as shown in FIG. 14 during power transmission with a magnetic field. Specifically, even if a difference in a load is large between a plurality of feeding target units, for example, even if one electronic unit 2A has an impedance Z2 of 300Ω (light load), and the other electronic unit 2B has an impedance Z3 of 10Ω (heavy load), transmission characteristics similar to those in the Example 1 are shown. That is, a reduction in transmission efficiency does not occur as it does in the comparative examples 1-2 and 2-1, and both an S parameter S21 (light load) and an S parameter S31 (heavy load) are maximized at a frequency in the vicinity of the resonance frequency $f_{res}$ of 120 kHz. In addition, power is preferentially (more) distributed to a unit (the electronic unit 2B) on a heavy load side that needs to be supplied with relatively much power. It is to be noted that the transmission characteristics shown in FIG. 14 are also obtained by simulation under an example condition of Z1=10Ω, Z2=300Ω, Z3=10Ω, L1=393 µH, C1=4.5 nF, L2p=69 µH, C2=55 nF, and C2s=55 nF.

Moreover, in the embodiment, each of the electronic units 2A and 2B also does not need the transformer, which is unlike the comparative example 2-2, and thus the number of components need not be increased within a feeding target unit, and consequently transmission efficiency is improved in a simple configuration, while size and cost are reduced.

As described above, the second embodiment also provides the effects similar to those in the first embodiment through the similar functions. Specifically, transmission characteristics are improved in a simple configuration during power transmission with a magnetic field.

[Third Embodiment]

[Configuration of Power Transmission Sections 110A and 110B]

FIGS. 15A and 15B illustrate circuit configurations of power transmission sections 110A and 110B, respectively, according to a third embodiment. The feed system of the embodiment includes one feed unit 1 having a power transmission section 110A or 110B, and one or more feeding target units (electronic units). In the embodiment, the feed unit 1 has a configuration similar to that of the feed unit 1 in the first and second embodiments except that the power transmission section 110A or 110B is provided in place of the power transmission section 110.

(Power Transmission Section 110A)

The power transmission section 110A shown in FIG. 15A includes a power transmission coil L1, a capacitor C1p that together with the power transmission coil L1 defines an LC resonant circuit (an LC parallel resonant circuit), and a capacitor C1s as a capacitive reactance element (capacitive element). The capacitor C1p is electrically connected in parallel to the power transmission coil L1, and the capacitor C1s is electrically connected in series to the power transmission coil L1, or to the LC parallel resonant circuit. Specifically, a first end of the capacitor C1p is connected to a first end of the power transmission coil L1 and a first end of the capacitor C1s, and a second end of the capacitor C1s is connected to a first end of a block of an impedance Z1. Second ends of the power transmission coil L1, the capacitor C1p, and the block of the impedance Z1 are grounded.

In the power transmission section 110A, the power transmission coil L1 and the capacitor C1p define the LC parallel resonant circuit, and the power transmission coil L1 in the LC parallel resonant circuit and the capacitor C1s define an LC resonant circuit (an LC series resonant circuit). The two LC resonant circuits (the LC parallel resonant circuit and the LC series resonant circuit) perform LC resonance operations at a resonance frequency, $f_{res}$, which is substantially the same as or close to the frequency of the high-frequency power (AC signal) generated by a high-frequency power generation circuit 111. Specifically, the LC resonant circuit defined by the power transmission coil L1 and the capacitor C1p or C1s, and an LC resonant circuit in the feeding target unit perform LC resonance operations at substantially the same resonance frequency $f_{res}$.

(Power Transmission Section 110B)

The power transmission section 110B shown in FIG. 15B includes a power transmission coil L1p, a capacitor C1 that together with the power transmission coil L1p define an LC resonant circuit (an LC parallel resonant circuit), and a coil L1s as an inductive reactance element (inductive element). The capacitor C1 is electrically connected in parallel to the power transmission coil L1p, and the coil L1s is electrically connected in series to the capacitor C1, or to the LC parallel resonant circuit. Specifically, a first end of the capacitor C1 is connected to a first end of the power transmission coil L1p and a first end of the coil L1s, and a second end of the coil L1s is connected to a first end of a block of an impedance Z1. Second ends of the power transmission coil L1p, the capacitor C1, and the block of the impedance Z1 are grounded.

In the power transmission section 110B, the power transmission coil L1p and the capacitor C1 define the LC parallel resonant circuit, and the capacitor C1 in the LC parallel resonant circuit and the coil L1s define an LC resonant circuit (an LC series resonant circuit). The two LC resonant circuits (the LC parallel resonant circuit and the LC series resonant circuit) perform LC resonance operations at a resonance frequency, $f_{res}$, which is substantially the same as or close to the frequency of the high-frequency power (AC signal) generated by the high-frequency power generation circuit 111. Specifically, the LC resonant circuit defined by the capacitor C1 and the power transmission coil L1*p* or the coil L1*s*, and the LC resonant circuit in the feeding target unit perform LC resonance operations at substantially the same resonance frequency $f_{res}$.

[Function and Effect of Power Transmission Sections 110A and 110B]

As described above, in the third embodiment, the feed unit 1 includes the power transmission section 110A in which the power transmission coil L1 and the capacitor C1*p* are connected in parallel to each other and thus define the LC parallel resonant circuit. In addition, the capacitor C1*s* is connected in series to the LC parallel resonant circuit. Specifically, the coil L1 in the LC parallel resonant circuit and the capacitor C1*s* define the LC series resonant circuit.

Consequently, the two LC resonant circuits (the LC parallel resonant circuit and the LC series resonant circuit) perform LC resonance operations at the resonance frequency $f_{res}$. Specifically, during power transmission with a magnetic field, the LC parallel resonant circuit performs an LC parallel resonance operation, and the coil L1 in the LC parallel resonant circuit and the capacitor C1*s* perform an LC series resonance operation. To collectively express the two LC resonance operations (the LC parallel resonance operation and the LC series resonance operation) of the power transmission section 110A, the resonance frequency $f_{res}$ is defined by an expression (3) described below.

As described above, in the third embodiment, alternatively, the feed unit 1 includes the power transmission section 110B in which the power transmission coil L1*p* and the capacitor C1 are connected in parallel to each other and thus define the LC parallel resonant circuit. In addition, the coil L1*s* is connected in series to the LC parallel resonant circuit. Specifically, the capacitor C1 in the LC parallel resonant circuit and the coil L1*s* define the LC series resonant circuit.

Consequently, the two LC resonant circuits (the LC parallel resonant circuit and the LC series resonant circuit) perform LC resonance operations at the resonance frequency $f_{res}$. Specifically, during power transmission with a magnetic field, the LC parallel resonant circuit performs an LC parallel resonance operation, and the capacitor C1 in the LC parallel resonant circuit and the coil L1*s* perform an LC series resonance operation. To collectively express the two LC resonance operations (the LC parallel resonance operation and the LC series resonance operation) of the power transmission section 110B, the resonance frequency $f_{res}$ is defined by the following expression (4).

[Expression 3]

$$\begin{cases} L1 \times (C1p + C1s) = \dfrac{1}{(2\pi f_{res})^2} & (3) \\ C1 \times \dfrac{L1p \times L1s}{(L1p + L1s)} = \dfrac{1}{(2\pi f_{res})^2} & (4) \end{cases}$$

Moreover, in the third embodiment, the feed unit 1 also does not need the transformer, which is unlike the comparative example 2-2, and thus the number of components need not be increased within the feed unit 1, and consequently transmission efficiency is improved in a simple configuration, while size and cost are reduced.

As described above, the embodiment also provides the effects similar to those in the first and second embodiments through the similar functions. Specifically, transmission characteristics are improved in a simple configuration during power transmission with a magnetic field.

[Fourth Embodiment]

FIG. 16 illustrates a circuit configuration of each of a power transmission section 110A or 110B and a power receiving section 210 or 210A of a feed system (a feed system 4B) according to a fourth embodiment. The feed system 4B of the fourth embodiment includes one feed unit 1 having the power transmission section 110A or 110B, and two electronic units 2A and 2B each having the power receiving section 210 or 210A.

Specifically, the feed system 4B corresponds to a combination of the feed unit 1 having the power transmission section 110A or 110B described in the third embodiment and the electronic units 2A and 2B having the power receiving section 210 or 210A described in the first or second embodiment. That is, in one or both of the power transmission section in the feed unit 1 and the power receiving section in each of the electronic units 2A and 2B, a power transmission coil or a power receiving coil and a resonance capacitor (a first or second capacitor) are connected in parallel to each other, and thus define an LC parallel resonant circuit. In addition, a capacitive or inductive reactance element is in series connection to the LC parallel resonant circuit.

The embodiment having such a configuration also provides the effects similar to those in the first to third embodiments through the similar functions. Specifically, transmission characteristics are improved in a simple configuration during power transmission with a magnetic field.

In particular, in the case where the LC series resonant circuit is provided in both the power transmission section and the power receiving section (in the case where both the power transmission section 110 or 110B and the power receiving section 210 or 210A are provided), the following effect is also obtained. Specifically, the number of parameters for impedance matching is increased, and thus impedance matching is readily achieved.

[Modifications]

While the technology of the disclosure has been described with several foregoing embodiments, the technology is not limited to those embodiments, and various modifications or alterations of the technology may be made.

For example, each of the various types of coils (a power transmission coil, a power receiving coil, and a coil used as an inductive reactance element) described in the foregoing embodiments may have a variety of configurations/shapes, without limitation. Specifically, the coil may have, for example, a spiral or loop shape, a bar shape including a magnetic substance, an alpha winding shape where a spiral coil is set in two layers in a folded manner, a spiral shape in three or more layers, and a helical shape where a wire is wound in a thickness direction. The coil is not limited to a winding coil including a conductive wire rod, and may be a conductive patterned coil formed of a printed circuit board or a flexible printed circuit board. It is to be noted that a coupling coefficient between the power transmission coil and the power receiving coil is desirably 0.001 or more in each case.

Moreover, while the foregoing embodiments have been described with an electronic unit as an example of a feeding target unit, other feeding target units (for example, vehicles such as an electric car) may be used without limitation.

Furthermore, while the foregoing embodiments have been specifically described with the components of the feed unit and of the electronic unit, each of the units may not have all of the components, or may further have other components. For example, the feed unit or the electronic unit may have a communication function or some control function, a display function, a function of verifying a secondary unit, a function of determining a secondary unit placed on a primary unit, and a function of detecting mixing of dissimilar metals.

In addition, while the foregoing embodiments have been mainly described with an example case where a plurality of electronic units (namely, two electronic units) are provided in the feed system, only one electronic unit may be provided in the feed system without limitation.

In addition, while the embodiments have been described with the charging tray as an example of a feed unit, for a small electronic unit (CE unit) such as a mobile phone, the feed unit is not limited to such a household charging tray, and may be applied to any other chargers for various electronic units. In addition, the feed unit is not necessarily of a tray-type, and may be of a stand-type for an electronic unit, such as a so-called cradle.

It is possible to achieve at least the following configurations from the above-described example embodiments and the modifications of the disclosure.

(1) A power receiving circuit, including:
an LC parallel resonant circuit; and
a reactance element electrically connected in series to the LC parallel resonant circuit,
wherein,
the power receiving circuit receives power in a noncontact manner.

(2) The power receiving circuit of (1), wherein the reactance element is a capacitive element.

(3) The power receiving circuit of (1), wherein the reactance element is an inductive element.

(4) The power receiving circuit of (1), wherein one of a coil and a capacitor in the LC parallel resonant circuit and the reactance element define an LC series resonant circuit.

(5) The power receiving circuit of (1), wherein the power receiving circuit receives power in the noncontact manner via a coil in the LC parallel resonant circuit.

(6) The power receiving circuit of (1), wherein power is transmitted to the power receiving circuit with a magnetic field.

(7) A power transmitting circuit, including:
an LC parallel resonant circuit; and
a reactance element electrically connected in series to the LC parallel resonant circuit,
wherein,
the power transmitting circuit transmits power in a non-contact manner.

(8) The power transmitting circuit of (7), wherein the reactance element is a capacitive element.

(9) The power transmitting circuit of (7), wherein the reactance element is an inductive element.

(10) The power transmitting circuit of (7), wherein one of a coil and a capacitor in the LC parallel resonant circuit and the reactance element define an LC series resonant circuit.

(11) The power transmitting circuit of (7), wherein the power transmitting circuit transmits power in the noncontact manner via a coil in the LC parallel resonant circuit.

(12) The power transmitting circuit of (7), wherein the power transmitting circuit transmits power with a magnetic field.

(13) An apparatus including:
a power receiving section, the power receiving section including
(a) an LC parallel resonant circuit, and
(b) a reactance element electrically connected in series to the LC parallel resonant circuit,
wherein,
the power receiving section receives power in a noncontact manner.

(14) The apparatus of (13), wherein the reactance element is a capacitive element.

(15) The apparatus of (13), wherein the reactance element is an inductive element.

(16) The apparatus of (13), wherein one of a coil and a capacitor in the LC parallel resonant circuit and the reactance element define an LC series resonant circuit.

(17) The apparatus of (13), further including:
a battery that is chargeable using power received by the power receiving section.

(18) The apparatus of (13), wherein the apparatus is an electronic unit or a vehicle.

(19) The apparatus of (18), wherein the electronic unit is a mobile or portable device.

(20) The apparatus of (18), wherein the vehicle is an electric car.

(21) The apparatus of (14), wherein a ratio between capacitance values of a capacitor in the LC parallel resonant circuit and the reactance element can be varied.

(22) The apparatus of (13), wherein the power receiving section receives AC power, and the apparatus further includes:
a rectifier circuit that rectifies AC power supplied from the power receiving section to generate DC power.

(23) The apparatus of (13), further including:
a load including a battery that is chargeable using power received by the power receiving section.

(24) The apparatus of (13), wherein the power receiving section receives power in the noncontact manner via a coil in the LC parallel resonant circuit.

(25) The apparatus of (13), wherein power is transmitted to the apparatus with a magnetic field.

(26) The apparatus of (21), further including:
a voltage stabilization circuit that performs voltage stabilization operation based on the DC power supplied from the rectifier circuit for charging a battery.

(27) A feed system including:
a feed unit; and
one or more target units receiving power transmitted by the feed unit,
wherein,
each of the one or more target units includes a power receiving section, the power receiving section including
(a) an LC parallel resonant circuit, and
(b) a reactance element electrically connected in series to the LC parallel resonant circuit,
the power receiving section receiving power from the feed unit in a noncontact manner.

(28) The feed system of (26), wherein:
the reactance element is a capacitive or inductive element, and
one of a coil and a capacitor in the LC parallel resonant circuit and the reactance element define an LC series resonant circuit.

(29) The feed system of (26), wherein:
the reactance element is a capacitive element, and
a ratio between capacitance values of a capacitor in the LC parallel resonant circuit and the reactance element can be varied.

(30) A feed system including:
a feed unit; and
one or more target units receiving power transmitted by the feed unit,
wherein,
the feed unit includes a power transmission section, the power transmission section including
(a) an LC parallel resonant circuit, and
(b) a reactance element electrically connected in series to the LC parallel resonant circuit,
the power transmission section transmitting power to each of the one or more target units in a noncontact manner.

(31) The feed system of (30), wherein:
the reactance element is a capacitive or inductive element, and
one of a coil and a capacitor in the LC parallel resonant circuit and the reactance element define an LC series resonant circuit.

(32) A feed system including:
a feed unit; and
one or more target units receiving power transmitted by the feed unit,
wherein,
each of the one or more target units includes a power receiving section, the power receiving section including
(a) a first LC parallel resonant circuit, and
(b) a first reactance element electrically connected in series to the LC parallel resonant circuit,
the power receiving section receiving power from the feed unit in a noncontact manner.

(33) The feed system of (32), wherein:
the first reactance element is a capacitive or inductive element, and
one of a coil and a capacitor in the first LC parallel resonant circuit and the first reactance element define a first LC series resonant circuit.

(34) The feed system of (32), wherein:
the first reactance element is a capacitive element, and
a ratio between capacitance values of a capacitor in the first LC parallel resonant circuit and the first reactance element can be varied.

(35) The feed system of (32), wherein the feed unit transmits power to the one or more target units with a magnetic field, and the power receiving section receives the transmitted power in the noncontact manner via a coil in the first LC parallel resonant circuit.

(36) The feed system of (32), wherein the feed unit includes a power transmission section, the power transmission section including a coil and a capacitor that are electrically connected in series to form an LC series resonant circuit.

(37) The feed system of (32), wherein the feed unit includes a power transmission section, the power transmission section including
(a) a second LC parallel resonant circuit, and
(b) a second reactance element electrically connected in series to the second LC parallel resonant circuit.

(38) The feed system of (32), wherein:
the second reactance element is a capacitive or inductive element, and
one of a coil and a capacitor in the second LC parallel resonant circuit and the second reactance element define a second LC series resonant circuit.

(39) The feed system of (32), wherein each of the one or more target units is one of an electronic unit and a vehicle.

(40) The feed system of (39), wherein the electronic unit is a mobile or portable device.

(41) The feed system of (39), wherein the vehicle is an electric car.

(42) A feed system including:
a feed unit; and
one or more target units receiving power transmitted by the feed unit,
wherein,
the feed unit includes a power transmission section, the power transmission section including
(a) a first LC parallel resonant circuit, and
(b) a first reactance element electrically connected in series to the first LC parallel resonant circuit,
the power transmission section transmitting power to each of the one or more target units in a noncontact manner.

(43) The feed system of (42), wherein:
the first reactance element is a capacitive or inductive element, and
one of a coil and a capacitor in the first LC parallel resonant circuit and the reactance element define a first LC series resonant circuit.

(44) The feed system of (42), wherein each of the one or more target units includes a power receiving section, the power receiving section including
(a) a second LC parallel resonant circuit, and
(b) a second reactance element electrically connected in series to the second LC parallel resonant circuit.

(45) The feed system of (42), wherein:
the second reactance element is a capacitive or inductive element, and
one of a coil and a capacitor in the second LC parallel resonant circuit and the second reactance element define a second LC series resonant circuit.

(46) The feed system of (42), wherein each of the one or more target units is one of an electronic unit and a vehicle.

(47) The feed system of (46), wherein the electronic unit is a mobile or portable device.

(48) The feed system of (46), wherein the vehicle is an electric car.

(49) The feed system of (42), wherein the power transmission section transmits power to each of the one or more target units in the noncontact manner via a coil in the first LC parallel resonant circuit.

The present disclosure contains subject matter related to that disclosed in Japanese Priority Patent Application JP 2011-193543 filed in the Japan Patent Office on Sep. 6, 2011, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

The invention claimed is:
1. A power receiving circuit, comprising:
an LC parallel resonant circuit;
an LC series resonant circuit that comprises a reactance element configured to electrically connect in series with the LC parallel resonant circuit, wherein the LC parallel resonant circuit and the LC series resonant circuit are configured to perform a first LC resonance operation at a resonance frequency, and the power receiving circuit configured to receive power from a power transmitting circuit in a noncontact manner, wherein the power transmitting circuit performs a second LC resonance operation at the resonance frequency.

2. The power receiving circuit of claim 1, wherein the reactance element is a capacitive element.

3. The power receiving circuit of claim 1, wherein the reactance element is an inductive element.

4. The power receiving circuit of claim 1, wherein one of a coil or a capacitor in the LC parallel resonant circuit and the reactance element define the LC series resonant circuit.

5. A power transmitting circuit, comprising:
an LC parallel resonant circuit;
an LC series resonant circuit that comprises a reactance element configured to electrically connect in series with the LC parallel resonant circuit,
wherein the LC parallel resonant circuit and the LC series resonant circuit are configured to perform a first LC resonance operation at a resonance frequency, and
the power transmitting circuit configured to transmit power to a power receiving circuit in a noncontact manner,
wherein the power receiving circuit performs a second LC resonance operation at the resonance frequency.

6. The power transmitting circuit of claim 5, wherein the reactance element is a capacitive element.

7. The power transmitting circuit of claim 5, wherein the reactance element is an inductive element.

8. The power transmitting circuit of claim 5, wherein one of a coil or a capacitor in the LC parallel resonant circuit and the reactance element define the LC series resonant circuit.

9. An apparatus, comprising:
a power receiving section, wherein the power receiving section includes:
(a) an LC parallel resonant circuit;
(b) an LC series resonant circuit that comprises a reactance element configured to electrically connect in series with the LC parallel resonant circuit,
wherein the LC parallel resonant circuit and the LC series resonant circuit are configured to perform a first LC resonance operation at a resonance frequency, and
the power receiving section configured to receive power from a power transmitting section in a noncontact manner,
wherein the power transmitting section performs a second LC resonance operation at the resonance frequency.

10. The apparatus of claim 9, wherein the reactance element is a capacitive element.

11. The apparatus of claim 9, wherein the reactance element is an inductive element.

12. The apparatus of claim 9, wherein one of a coil or a capacitor in the LC parallel resonant circuit and the reactance element define the LC series resonant circuit.

13. The apparatus of claim 9, further comprising:
a battery configured to charge based on the power received by the power receiving section.

14. The apparatus of claim 9, wherein the apparatus is an electronic unit or a vehicle.

15. The apparatus of claim 10, wherein a ratio between capacitance values of a capacitor in the LC parallel resonant circuit and the reactance element can be varied.

16. A feed system, comprising:
a feed unit;
one or more target units configured to receive power transmitted from the feed unit, wherein each of the one or more target units includes a power receiving section, wherein the power receiving section includes:
(a) an LC parallel resonant circuit;
(b) an LC series resonant circuit that comprises a reactance element configured to electrically connect in series with the LC parallel resonant circuit,
wherein the LC parallel resonant circuit and the LC series resonant circuit are configured to perform a first LC resonance operation at a resonance frequency, and
the power receiving section configured to receive power from the feed unit in a noncontact manner,
wherein the feed unit performs a second LC resonance operation at the resonance frequency.

17. The feed system of claim 16, wherein:
the reactance element is a capacitive or an inductive element, and
one of a coil or a capacitor in the LC parallel resonant circuit and the reactance element define the LC series resonant circuit.

18. The feed system of claim 16, wherein:
the reactance element is a capacitive element, and
a ratio between capacitance values of a capacitor in the LC parallel resonant circuit and the reactance element can be varied.

19. A feed system, comprising:
a feed unit;
one or more target units configured to receive power transmitted from the feed unit, wherein the feed unit includes a power transmission section, wherein the power transmission section includes:
(a) an LC parallel resonant circuit;
(b) an LC series resonant circuit that comprises a reactance element configured to electrically connect in series with the LC parallel resonant circuit,
wherein the LC parallel resonant circuit and the LC series resonant circuit are configured to perform a first LC resonance operation at a resonance frequency, and
the power transmission section configured to transmit power to each of the one or more target units in a noncontact manner,
wherein the one or more target units performs a second LC resonance operation at the resonance frequency.

20. The feed system of claim 19, wherein:
the reactance element is a capacitive or an inductive element, and
one of a coil or a capacitor in the LC parallel resonant circuit and the reactance element define the LC series resonant circuit.

* * * * *